United States Patent [19]

Jabas

[11] Patent Number: 4,515,143
[45] Date of Patent: May 7, 1985

[54] MOVING AIR OVEN FOR BAKING AND THE LIKE

[76] Inventor: Florian H. Jabas, 712 Chautauqua Rd., Marinette, Wis. 54143

[21] Appl. No.: 604,455

[22] Filed: Apr. 27, 1984

[51] Int. Cl.³ .......................... A21B 1/06; F24C 15/32
[52] U.S. Cl. .................................. 126/21 A; 126/246; 312/236; 219/400
[58] Field of Search ................ 126/21 A, 21 R, 19 R, 126/39 C, 273 R, 246; 312/236; 219/385, 386, 400, 399, 401, 403; 34/196, 191, 212, 219

[56] References Cited

U.S. PATENT DOCUMENTS

| | | | |
|---|---|---|---|
| 1,943,575 | 1/1934 | Abendroth | 219/400 |
| 3,261,650 | 7/1966 | Stromqvist | 312/236 |
| 3,368,062 | 2/1968 | Gramenius et al. | 126/21 A |
| 3,439,665 | 4/1969 | Stromqvist | 126/21 A |
| 3,719,180 | 3/1973 | Pere | 126/21 A |
| 3,861,378 | 1/1975 | Rhoads et al. | 219/400 |
| 3,895,215 | 7/1975 | Gordon | 126/21 A |
| 4,030,476 | 6/1977 | Hock | 126/246 |

FOREIGN PATENT DOCUMENTS

| | | | |
|---|---|---|---|
| 522007 | 4/1953 | Belgium | 219/400 |
| 3020374 | 12/1981 | Fed. Rep. of Germany | 126/21 A |
| 831364 | 3/1960 | United Kingdom | 312/236 |

Primary Examiner—James C. Yeung
Attorney, Agent, or Firm—Schwartz, Jeffery, Schwaab, Mack, Blumenthal & Koch

[57] ABSTRACT

An oven frame is formed by interconnected back, side, top and bottom walls, and at least one opening at the front thereof for receiving a door. An inner cover is mounted in spaced relation to the top wall to form a top air channel, with fan means being positioned in the channel. Plate means are vertically positioned at each side of said enclosure and spaced from the side walls so as to define therewith outer air channels in air flow communication with the top air channel. Heating means are positioned in the outer channels and spaced from the plate means to accommodate air flow on either side thereof. Inner walls are spaced inwardly from the plates and define therewith inner flow channels communicating with said outer channels through bottom openings in the plate means. The inner walls are formed with openings through which heated air can pass from the inner channel to the enclosure. Air guide means are mounted on the inner surface of the inner walls, and aligned with and covering the openings formed in the inner walls and having open inner ends through which the heated air can pass into said enclosure.

7 Claims, 3 Drawing Figures

MOVING AIR OVEN FOR BAKING AND THE LIKE

BACKGROUND OF THE INVENTION

The present invention relates as indicated to an oven for baking food products, and relates more particularly to an oven having a controlled air flow means to provide even heat distribution from top to bottom in the baking chamber.

Many convection ovens are equipped with fans capable of moving heated air throughout the baking cavity at various velocities. Normally these ovens provide a rapid distribution of air over the food products which are placed on baking pans stacked one above the other. However, the air distribution is not uniform. As a result, particularly when dough products are being baked, there is usually an uneven bake either across one pan or from pan to pan from top to bottom in the oven.

Prior to the present invention, ovens of the type described normally baked some products adequately but did not give satisfactory results for both what are termed low products such as cookies and what are termed high products such as bread. In addition, some of the pans in the oven had to be removed, rotated and put back into the oven to obtain an even bake and uniform coloring of the product.

In order to improve baking results ovens, with multiple rotating fans or larger ovens with rotating pan racks have been utilized. These units are generally more costly, require more room, and have more moving parts thereby increasing maintenance requirements. In short, in an attempt to obtain the results obtained by the present invention, prior art ovens have been characterized by being relatively complicated and thus costly, or providing a shortfall in performance, or both.

SUMMARY OF THE INVENTION

With the above in mind, a principal objective in accordance with the present invention is to provide an oven with a controlled air flow by means of which the oven can be utilized for a complete range of food products. The air flow design includes chambers for passing the air over heaters and then into the oven chamber through specifically located air guides.

The design regulating the air flow is further characterized by the air being directed evenly from each side of the oven chamber under and across the baking pans stacked vertically in the oven. This directed air flow is important not only in providing an even baked product on each pan from front to back but also from side to side, thereby improving the appearance and quality of the end product, and reducing waste.

A still further advantage of the oven is its simplified construction and consequent low manufacturing costs. There are a minimum of moving parts involved, thereby reducing maintenance problems and costs. The relatively simple construction permits the panels forming the air chambers to be removably mounted within the oven cavity thereby allowing ease of cleaning of the surfaces exposed to air flow for health and sanitation reasons. It also permits easy access to electrical and mechanical components, thereby reducing service costs.

A still further, significant advantage of the invention is the flexible design providing for different capacity units tailored to customer needs. The oven compartment incorporating the air flow design of this invention can be built to accommodate as few as five pans or as many as twenty pans depending on the products to be baked.

These and other objects will become apparent as the following description proceeds, in particular reference to the application drawings.

BRIEF DESCRIPTION OF THE APPLICATION DRAWINGS

DETAILED DESCRIPTION OF THE PREFERRED EMBODIMENTS

Figure 1:
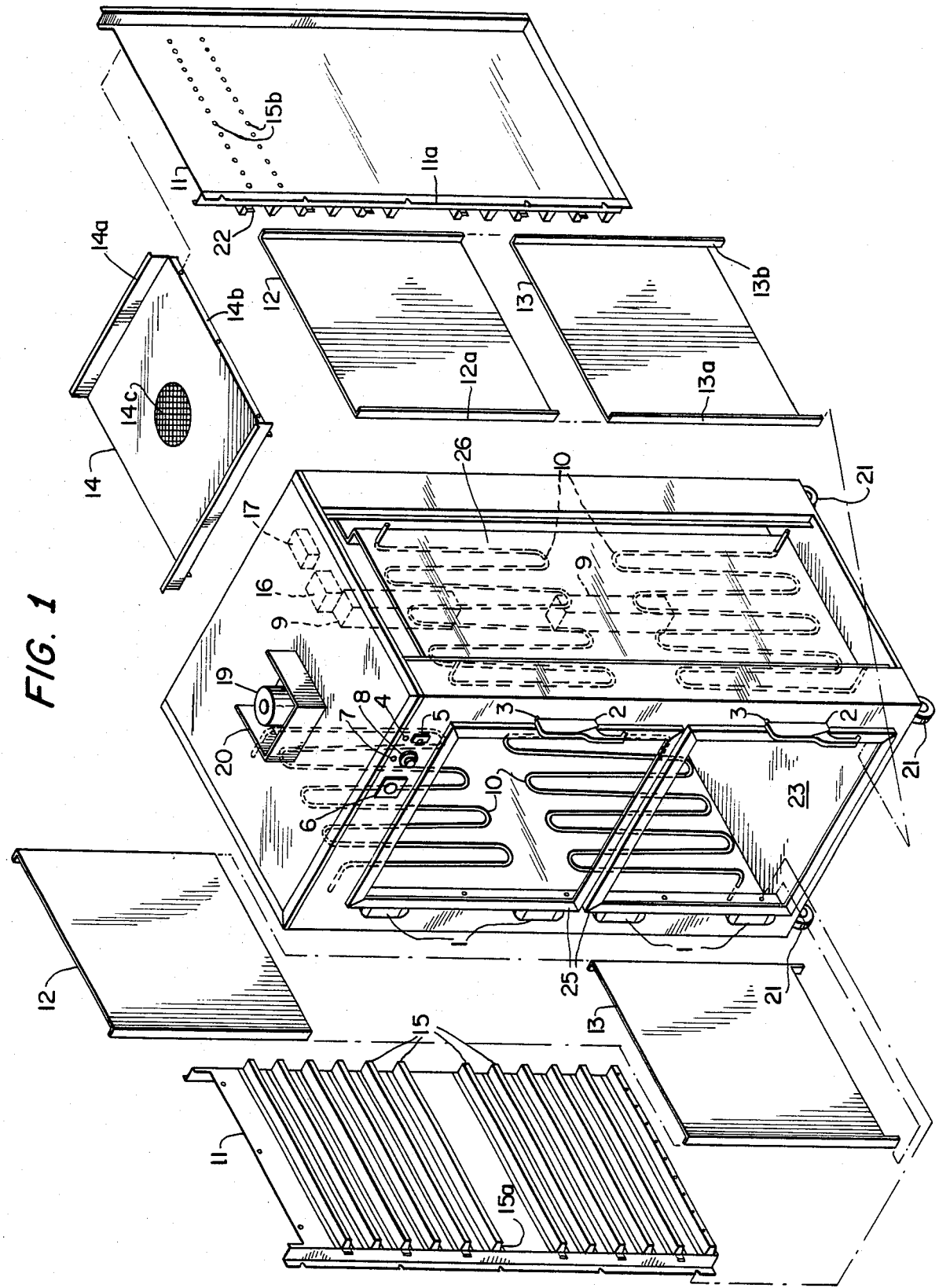
FIG. 1 is an exploded view, showing the oven constructed in accordance with the present invention.
Figure 3:
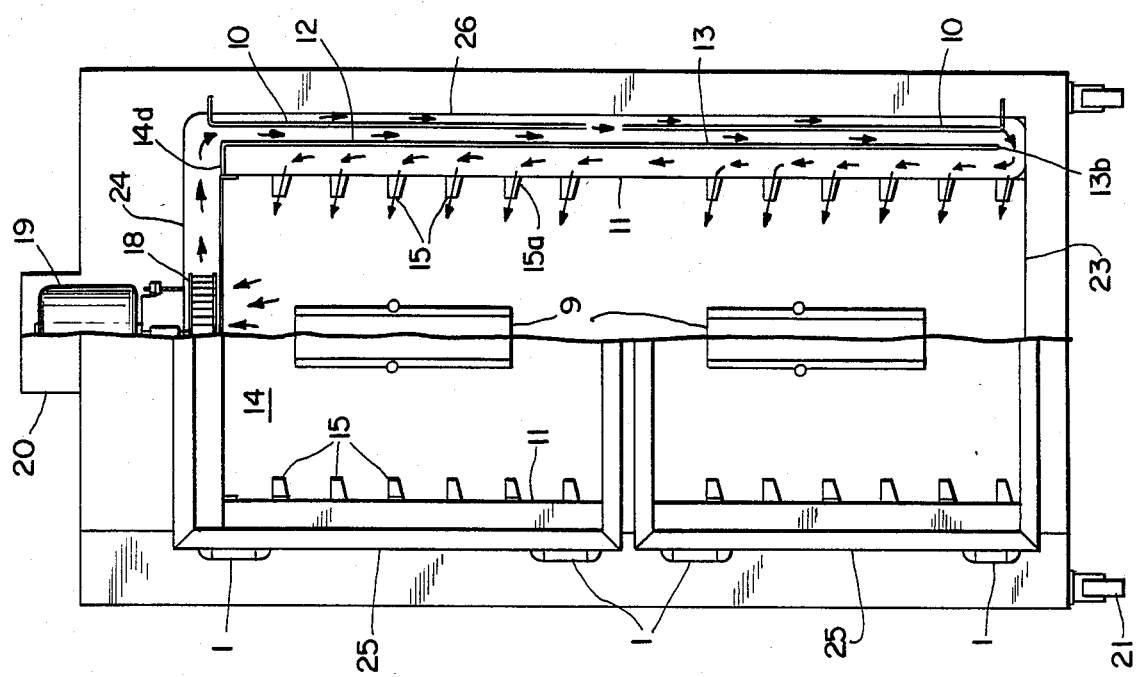
FIG. 3 is a front elevational and partial vertical sectional view of the oven, the sectional view being taken along line 2—2 of FIG. 2.

Referring now to the application drawings, wherein like parts are indicated by like reference numerals, and initially to FIGS. 1 and 3, the oven of the present invention is generally indicated at A, being constructed from formed corner posts, headers, a top 24 and a bottom 23 all of which are interconnected to form a frame. These members are generally welded to form a rigid construction capable of being heated to 500° F. without any significant distortion. Side walls 26 and the back wall are inserted and welded to the top, bottom and corner post numbers. The outer surfaces of the side walls, back, bottom, and top are insulated and covered by panels to form the completed unit, all in conventional fashion and accordingly not shown in the application drawings. The outer surface of side wall 26 is shown in FIG. 1.

The doors 25 at the front of the oven are mounted on hinges 1 and retained in a closed position by catch latches 2. The doors 25 have a sealing gasket (not shown) around the perimeter thereof to provide when closed an essentially air tight compartment in which air is recirculated rather than exchanged with the outside atmosphere.

Figure 2:
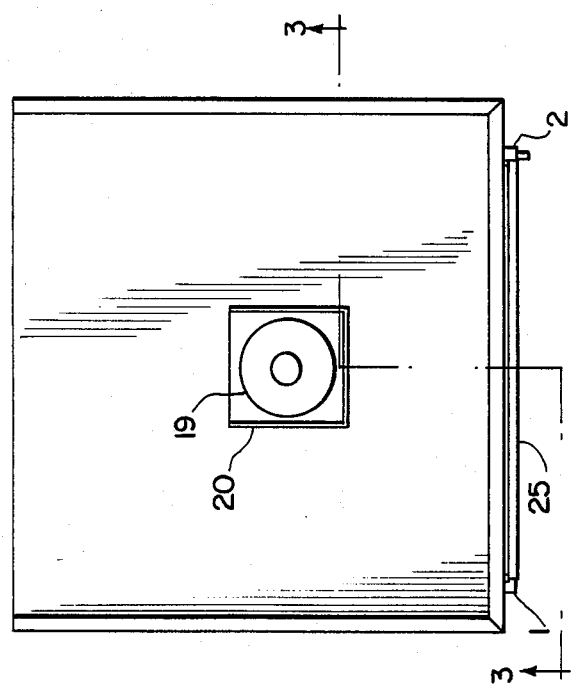
FIG. 2 is a top plan view of the oven of FIG. 1.

As shown in FIGS. 2 and 3, a motor 19 is mounted on the top of the oven in a housing or shroud 20, with the shaft (not shown) of the motor mounting a fan 18. The fan is generally centrally mounted at the top of the oven and serves to circulate air in essentially equal amounts through the top channel partially defined by the top 24 of the oven to both sides thereof. If desired, the motor 19 can be electrically connected to micro switches 3 mounted on the front of the oven and adapted to be depressed by the latch 2 when either door 25 is closed. When one or both the doors are open, the micro switch or switches are deactuated and the fan motor 19 shut off. A separate switching circuit can be alternatively be provided for opening and closing the circuit to the fan motor.

An important feature of the present invention is the provision of air channels at the top and sides of the oven. The channels at the sides are formed by removable plates 12 and 13 which are mounted in any suitable manner on the side walls 26 of the oven. The plates are preferably mounted for removal for cleaning if desired, and are formed with rearwardly extending flanges 12a and 13a, respectively, the outer edges of which contact the side walls 26 and serve to space the plates 12 and 13 from the adjacent side wall. If desired, additional spacer strips may be placed vertically between the plates 12 and 13 and the side walls 26 to maintain the desired spacing. It will be noted that the plate 13 is cut away at the bottom thereof as shown at 13b in FIG. 1 to provide an opening at the bottom of the plate through which circulating air can pass between the plate 13 and the bottom 23 of the oven.

The plates 12 and 13 may be constructed of any suitable material such as, for example, aluminum plate. The material employed must be such as to transfer heat in the flow chambers and to maintain their shape at the operating temperatures in the oven.

The air flow chambers at the sides of the oven are further defined by inner removable walls 11, the construction of which can best be seen in FIG. 1. Each wall 11 is formed at the sides thereof with transversely extending flanges which are laterally deformed to form edge flanges 11a. The end flanges 11a can be removably mounted on the outer side walls 26 of the oven, and also on the edge of the corner posts by means of screw fasteners, retaining flanges, or other suitable means which per se form no part of the present invention. Vertical spacing members (not shown) can if desired be positioned between and fastened to the adjoining surfaces of the walls 11 and plates 12 and 13 to maintain a predetermined distance therebetween so as to form an inner channel for air flow.

The top air chamber in which is positioned the fan 18 is formed by an inner cover 14 which is inserted into the oven after the removable inner walls 11 are in place. The detailed construction of the inner cover 14 is shown in FIG. 1, with upwardly directed flanges being formed at the front and back thereof to space the cover 14 from the top wall 24, lateral flanges 14a abutting against such top wall. The cover 14 is thus predetermindly spaced from the top wall of the oven to form an air channel at the top of the oven. The cover 14 is additionally formed with downwardly extending flanges 14b through which suitable fastening means such as screws can extend and be secured in corresponding openings formed at the top edge of the removable inner walls 11.

The inner cover 14 is formed with an opening 14c to permit air to circulate from the oven cavity to the inlet side of the fan for recirculation, as shown by arrows in FIG. 3. A screen covers the opening 14c.

Referring to FIG. 3, a cap 14d is attached at the upper edge of the removable inner liner wall 11 and extends to the top of plate 12 to close off the upper edge of the air chamber defined by the wall 11 and plate 12. Thus, circulating air is forced down the channel defined by the plates 12 and 13 and the side wall 26 of the oven, again as shown by arrows in FIG. 3.

In the invention as shown, the oven is electrically operated, with the electrical components of the system being shown in FIG. 1, partially diagrammatically. Electrical power is fed to a power block 17 and contactor 16 at the top of the oven. Heat for the oven is controlled by a breaker switch 5 and thermostat 8, located on the front panel of the oven above the uppermost door 25. A timer 6 may be utilized if desired for automatically operating the oven for pre-set time conditions. Indicator lights 4 and 7, also located at the top front panel, serve to indicate whether the controls are on or off. Inside lighting for the oven is provided within light boxes 9 at one or both sides of the oven so that the products may be observed during baking.

Electrical resistance elements 10 provide the heat for the oven and are mounted in the outer air channel defined by plates 12 and 13 and the side walls 26 of the oven. The resistance elements are mounted in spaced relation to the inner surface of each side wall 26 by means of standoffs (not shown) or the like, which retain and space the elements, as shown in FIG. 3. Two separate elements are shown at each side of the oven in FIGS. 1 and 3, although it will be understood that a greater number of electrically connected elements could also be used. The heating elements 10 are preferably turned on and off automatically by means of the thermostat 8. Alternatively, the elements 10, as well as the fan motor 19, can be connected to the micro switch 3 so as to be shut off when either or both of the doors 25 are open.

A series of horizontally aligned and vertically spaced openings are formed in each inner wall 11 for the passage of heated air from the inner channel to the oven cavity. Two series of these openings are diagrammatically shown at 15b, and it will be understood that similar rows will be formed throughout the length of each wall.

Each of the removable inner walls 11 has mounted in vertically spaced relation thereon a series of air guides 15. The guides can be mounted in any suitable manner on the walls 12 and are generally trapezoidal in cross-section, with the inwardly directed end of the guide being open. The guides are mounted over the series of openings 15b in the inner wall 11 so as to receive the heated air and direct the same into the oven cavity. As best seen in FIG. 3, the bottom wall 15a of each guide is upwardly inclined so that the air directed therethrough flows in a slighly upward direction for the reasons noted below. The guides are formed with end flanges 22 by means of which the guides can be fastened or spot welded to the inner wall. It will be understood that other well known means could be exployed for mounting the guides on the inner walls 11.

The air guides 15 serve the additional function of providing supports for wire shelves which in turn support pans or trays used for the baking of the products. The guides 15 are accordingly mounted on the inner walls 11 such that oppositely disposed guides are parallel whereby the wire shelves can be positioned horizontally on the guides. The wire shelves are conventional and have accordingly not been illustrated in the drawings.

The number and size of the holes 15b formed in the inner walls 11 are coordinated with the size of the opening 14c formed in the inner cover 14, the capacity of the fan 18, and the speed of the motor 19 so as to provide an air flow over the food products in the oven cavity which is constant and uniform. This produces even baking from top to bottom. This is a distinct advantage when compared with prior art ovens of this general type where the oven cavity tends to be hotter at either the bottom or the top, thereby resulting in an uneven heating effect in the cavity.

The components and assembly of the oven should be apparent from the application drawings and the above description. FIG. 3 shows the relevant air flow assembly in operative position on the right side of the oven, and it will be understood that the left side of the oven is a mirror image of the components appearing on the right.

As shown, the oven is mounted on casters 21 to facilitate movement of the oven for cleaning, component removal, and the like.

In the operation of the oven, the shelves are placed on the aligned air guides. In the oven shown, there are 12 guides on each of the inner walls 11 whereby a corresponding number of shelves can be accommodated. Where products rise during the baking operation, for example, bread, some of these shelves may be removed to accommodate the baking operation.

Prior to use, the oven is preheated to a temperature of approximately 375° F. to 400° F. for bakery products, although it will be understood that other preheat temperatures can be employed depending upon the products being baked. Baking pans or trays are then placed on the shelves, normally from top to bottom if the full capacity of the oven is to be utilized. After the oven is loaded, the doors 25 are closed thereby, in a preferred manner of operation, automatically starting the motor 19 and the fan 18 driven thereby.

The air is directed outwardly to the sides of the oven, as shown in FIG. 3, and forced downwardly through the outer channels defined by the side walls 26 of the oven and the plates 12 and 13. The heating elements 10 positioned in the outer channel heat the air as it passes downwardly through the channels.

At the bottom of the outer channels, the air is reversed in direction of flow, passing through openings 13b formed at the bottom of the plates 13, and then flowing up the inner channels defined by the inner walls 11 and the plates 12 and 13. The openings 15a and the air guides permit the air to be discharged into the oven cavity, with the shape of the air guides, as above described, directing the air in a generally upward direction. Due to the positive pressure in the inner channel, air is simultaneously discharged through all of the air guide openings thereby providing an even flow of heated air throughout the oven cavity. The cap 14d ensures that all air entering the inner channel passes through the openings in the air guides.

Since the shelves are positioned on the top of oppositely disposed air guides, and the baking pans or trays positioned on the shelves, the air emitted through the openings 15b and the air guide strikes the bottom of the baking pan or tray thereby uniformly heating the bottom surface thereof. The air flow is then deflected downwardly to the upper surface of the products on the pan or tray positioned below. Thus, the air directed through the guides acts to heat the products in two ways, namely, the bottom of the products by conduction with the pan upon which the heated air impinges, and on the top of the products positioned on the pan below.

After the heated air is circulated under and over the products as described, it is withdrawn upwardly to the inlet side of the fan 18 through the screened opening 14c in the cover 14. The air is then recirculated by the fan 18 to complete the cycle.

The novel air flow provided by the invention offers several significant advantages over prior art oven designs. Perhaps foremost of these is the ability to provide even baking in the oven cavity from top to bottom and across each pan. Secondly, the concentrated heat source provided by the heating elements 10 is removed from close contact with the oven cavity due to the positioning of the elements in the outer channel spaced outwardly from the plates 12 and 13. This reduces searing of the products during the baking operation. Still further, the plates 12 and 13 conductively hold the heat and thus transfer the heat from the outer channel to the inner channel thereby reducing the recovery time when new products are placed in the oven cavity. Additionally, the entire inside of the oven can be readily cleaned by removing the plates 12 and 13, the inner walls 11, and the top cover 14.

All of these noted advantages are achieved by an air handling and heating arrangement which is very simple in construction and thus inexpensive to manufacture. The only moving part is the fan, and due to the efficient transfer of the heated air to the oven cavity, there is no need for multiple fans or other moving parts to divert air flow on an alternating basis from one side of the oven to the other. The even heating achieved also eliminates the need to provide rotating racks or other complex and expensive components to achieve the same end result, nor is it necessary to remove and rotate the shelves during the baking operation to achieve evenly baked products.

It will be understood that changes can be made in the invention as above described without departing from the inventive concepts of the invention. For example, electric heating elements different from those shown can be utilized, and gas or oil heaters can be employed as well. A single door could also be provided rather than the double doors shown. The size of the oven cavity and the number of shelves accommodated within the oven cavity can be selected based on the products to be baked, and the oven cavity may be enlarged sufficiently to accommodate role-in racks or carts. The invention can also be utilized for the even heating of non-food products such as plastics.

I claim:

1. An oven for evenly baking or heating products placed therein, comprising:
    (a) an insulated frame consisting of interconnected back, side, top and bottom walls, said frame defining at least one opening at the front thereof,
    (b) door means to close said opening and thus form with said walls an oven enclosure,
    (c) an inner cover positioned adjacent and in spaced relation to said top wall to form therewith a top air channel, said inner cover being formed with an opening to permit recirulation of air from said enclosure,
    (d) fan means positioned in said top air channel above said opening, and motor means for driving said fan means,
    (e) plate means vertically positioned at each side of said enclosure and spaced from said side walls so as to define therewith outer air channels in air flow communication with said top air channel, said plate means being formed with openings in the bottoms thereof,
    (f) heating means positioned in said outer channels and spaced from said plate means and said side walls so as to accommodate air flow on either side thereof,
    (g) inner walls spaced inwardly from said plates and defining therewith inner flow channels communicating with said outer channels through said bottom openings in said plate means, said inner walls being formed with a series of horizontally aligned and vertically spaced openings through which air can pass from said inner channel toward said enclosure, and
    (h) air guide means mounted on the inner surface of said inner walls, said air guide means being aligned with and covering said series of openings formed in said inner walls and having open inner ends through which the heated air can pass into said enclosure, whereby air is circulated by said fan outwardly through said top air channel, downwardly past said heating means in said outer channels so as to heat said air, upwardly through said inner channels and through said series of openings in said inner walls and then through said air guides to said enclosure, the arrangement providng even heating of said enclosure from top to bottom and laterally across.

2. The oven of claim 1 wherein said plate means comprises a pair of separate plates placed vertically one above the other, each of said plates being formed with transversely directed flanges at each side thereof for the purpose of predeterminedly spacing said plates from the side walls of said oven.

3. The oven of claim 1 wherein said heater means comprises electrical resistance elements carried by heating panels vertically oriented in said inner channels, said panels being mounted on said frame so as to be positioned approximately equidistant between the side walls of the oven and the plate means.

4. The oven of claim 1 wherein cap means is positioned at the top of said inner channels between said inner walls and said plate means thereby closing off said inner channels at the top thereof and forcing air entering said channels to be emitted therefrom through said openings formed in said inner walls.

5. The oven of claim 1 wherein said door means comprises at least one door hinged at the front of said oven, said door including a latch, and switch means mounted on the front of the oven frame adjacent said latch and adapted to be closed by said latch, said switch means being connected in an electrical circuit to said motor of said fan for actuating said motor when said door is latched in a closed position.

6. The oven of claim 5 wherein two separate doors are provided to close the front of the oven enclosure, each of said doors being provided with latch means adapted to close switch means for controlling the circuit to said fan motor.

7. The oven of claim 1 wherein said air guide means are generally trapezoidal in cross-section, with the bottom walls thereof, when mounted in operative position, being inclined upwardly so as to direct air emitted from said openings in said inner walls upwardly for impingement upon the bottom of pans or trays positioned on shelves supported by said guides, the air being reflected downwardly from the bottoms of said pans or trays for direct contact with said products, whereby said products are heated by conduction while on said pans or trays and by convection due to the reflected and circulated air.

* * * * *